Patented Nov. 29, 1949

2,489,355

UNITED STATES PATENT OFFICE 2,489,355

BENZOTRIAZINES

Frank J. Wolf, Westfield, and Karl Pfister, III, Elizabeth, N. J., assignors to Merck & Co., Inc., Rahway, N. J., a corporation of New Jersey No Drawing. Application January 10, 1947,
Serial No. 721,472

7 Claims. (Cl. 260—249.5)

This invention relates to new organic chemical compounds possessing therapeutic activity, and to methods by which they may be prepared from readily available starting materials. More particularly the invention relates to the preparation of 7 - halogen - 3 - (mono- and di-substituted amino) - benzotriazine-1,2,4-oxide-1 compounds, and to the chemical compounds so produced, which are useful intermediates in the preparation of complex organic compounds including antimalarial agents and dyes.

The new compounds of the present invention are prepared from 7-halogen - 3 - chloro-benzotriazine-1,2,4-oxides-1 which can readily be obtained from a 4-halogen-2-nitroaniline by reacting with phosgene in organic solvent solution, treating the reaction mixture thus obtained with anhydrous ammonia to form the corresponding 4-halogen-2-nitrophenyl urea, reacting the same with sodium hydroxide and acidifying to form the corresponding 7-halogen-3-hydroxy - benzotriazine-1,2,4-oxide-1, as fully described in our companion application Serial No. 721,470 filed January 10, 1947. This compound is then reacted with phosphorus oxychloride and a dialkyl aniline compound, as described in our companion application Serial No. 721,471 filed January 10, 1947 to form the desired 7 - halogen - 3 - chlorobenzotriazine-1,2,4-oxide-1- compound.

In carrying out the process of the present invention a 7 - halogen - 3 - chloro - benzotriazine-1,2,4-oxide-1 is reacted with a mono- or di-substituted amine including aliphatic, heterocyclic, and aromatic amines, in the presence of an inert solvent such as ethanol, methanol, carbon tetrachloride, chloroform, acetone, or the like, to form the corresponding 7-halogen-3-(mono- or di-substituted amino) - benzotriazine-1,2,4-oxide-1. The reaction is preferably carried out by heating to reflux for 15 to 20 hours. The reaction can be completed in a shorter time, however, by heating under pressure at temperatures of the order of 150° C. The reaction product can be obtained by cooling the reaction mixture to precipitate the same, or, after concentrating the reaction mixture to dryness, dissolving in additional hot solvent and cooling to crystallize the desired product. Purification is effected by recrystallizing the product from a suitable organic solvent, which is not necessarily the same solvent as is used in the initial reaction.

The reactions above described can be expressed by the following diagram:

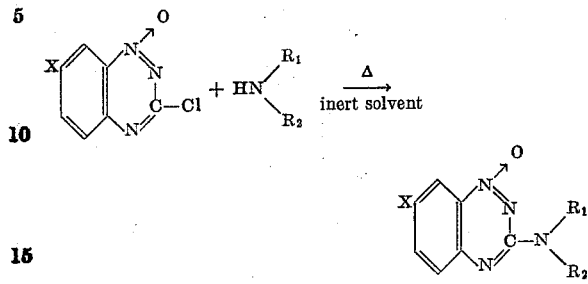

wherein X is halogen; $R_1$ is of the class consisting of hydrogen, and alkyl groups; $R_2$ is of the class consisting of alkyl, aryl, aralkyl, and heterocyclic groups; and $R_1$ and $R_2$ together can form part of a N- or O-heterocyclic radical.

The following examples show how the process of the present invention can be carried out, but it is to be understood that these examples are given by way of illustration and not of limitation.

Example 1

10 gms. of 3,7-dichloro-benzotriazine-1,2,4-oxide-1, and 6.8 gms. of n-butyl amine are refluxed for 18 hours in 100 ml. of carbon tetrachloride. At the end of this time the hot solution is filtered to remove the n-butylamine hydrochloride that forms. The filtrate is concentrated to dryness in vacuo and the residue dissolved in hot absolute alcohol, treated with powdered charcoal ("Norit") and filtered. Upon cooling the filtrate, yellow needles of 7-chloro-3-butylamino benzotriazine-1,2,4-oxide-1 formed, M. P. 170° C. Yield 7.7 gms., 70% of theoretical amount.

Example 2

A solution consisting of 6.6 gms. of 3,7-dichlorobenzotriazine-1,2,4-oxide-1 and 7.2 gms. of p-anisidine in 150 ml. of absolute ethanol is refluxed for 18 hours. Upon cooling the alcohol solution, a dark red precipitate of 7-chloro-3(p-methoxy phenylamino) - benzotriazine-1,2,4-oxide-1 is obtained. Yield 6.0 gms., M. P. 210–211° C., 65% o the theoretical amount.

Example 3

A mixture of 60 ml. of absolute alcohol, two grams of 3,7-dichlorobenzotriazine-1,2,4-oxide-1 and 2 grams of 6-methoxy 8-aminoquinoline are heated at 150° for 6 hours under pressure. At the end of this time, the reaction mixture is filtered and the product, 7-chloro-3-(6-methoxy-8-amino-quinoline) benzotriazine-1,2,4-oxide-1, recrystallized from pyridine. A yield of 1.4 grams of yellow material, M. P. 254° was obtained.

Example 4

A mixture of 7 g. of 3,7-dichlorobenzotriazine-1,2,4-oxide-1, 4.2 g. of allylamine and 150 ml. of absolute ethanol (2BA) was refluxed for 18 hours. The hot reaction mixture was treated with powdered charcoal ("Norit") and filtered. On cooling 4.4 g. of crystalline material, M. P. 157-158° was obtained (60% yield). A sample of this product, 7 - chloro - 3 - allylaminobenzotriazine-1,2,4-oxide-1, recrystallized from absolute ethanol (2BA) melted at 159-160°.

Analysis:
  Calcd: C=50.73  H=3.83  N=23.67
  Found: C=51.03  H=4.10  N=23.73, 23.96

By following the procedures of the foregoing examples many other 7-halogen benzotriazine-1,2,4-oxide-1 compounds having mono- or di-substituted amino groups can be prepared including the following products wherein R represents the group

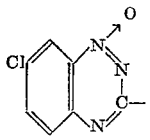

| Compounds | M. P. or B. P. | Per Cent Yield |
|---|---|---|
| R—N(H)—C(H)(CH$_3$)—(CH$_2$)$_5$CH$_3$ | 89-90° | 30 |
| R—N(H)—C(H)(CH$_3$)—(CH$_2$)$_3$N(C$_2$H$_5$)$_2$ | B. P. 130° at 3 microns. | 35 |
| R—N(H)—(CH$_2$)$_4$C(H)(NH$_2$)—COOH | 248° | 45 |
| R—N(CH$_2$CH$_2$CH$_3$)$_2$ | 105-6° | 69 |
| R—N(piperidino) | 142° | 73.5 |
| R—N(morpholino) | 175° | 63 |
| R—N(H)—C$_6$H$_4$—COOH | 300° | 75 |
| R—N(H)—C$_6$H$_4$—(CH$_2$)$_3$COOH | 250-1° | 74 |
| R—N(H)—CH$_2$—(3-hydroxy-4-hydroxymethyl-5-methylpyridyl) | 213-14°(d) | 62 |

| Compounds | M. P. or B. P. | Per Cent Yield |
|---|---|---|
| R—N(H)—C(H)(CH$_2$CH$_3$)—CH$_2$OH | 138° | 65 |
| R—N(H)—C(=NH)—NH$_2$ | 282° (d) | 90 |
| R—N(H)—(CH$_2$)$_2$—C$_6$H$_5$ | 195-6° | 51 |
| R—N(H)—(CH$_2$)$_2$—C$_6$H$_3$(OCH$_3$)$_2$ | 183-4° | 54 |
| R—N(H)—CH$_2$—C$_6$H$_5$ | 186° | 62 |
| R—N—C$_6$H$_4$—SO$_2$—C$_6$H$_4$—NH$_2$ | 293° | 79 |
| R—N(H)—(CH$_2$)$_{11}$CH$_3$ | 140° | 75 |
| R—N(H)—CH$_2$CH$_2$OH | 186° | 43 |
| R—N(H)—(CH$_2$)$_2$S(CH$_2$)$_2$N(C$_2$H$_5$) | 104-5° | 52 |
| R—N(H)—(CH$_2$)$_3$(C$_2$H$_5$) | 79° | 58 |
| R—NH—C$_6$H$_4$—NHCOCH$_3$ | 285-286° | 68 |
| R—NHCH(CH$_3$)(CH$_2$)$_3$N(C$_2$H$_5$)$_2$ | 88-89° | 36 |
| R—NH—(thiophene) | 142-143° | 36 |

It will be evident that other compounds having the same group R, as well as corresponding compounds having other halogen substituents in the 7-position can be prepared in like manner.

Modifications can be made in the procedures herein disclosed without departing from the spirit and scope of the present invention, and we are to be limited only by the appended claims.

We claim:

1. A compound of the formula

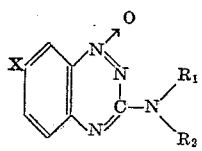

wherein X is halogen, R$_1$ is of the class consisting of hydrogen and alkyl groups, R$_2$ is of the class consisting of alkyl, aryl, aralkyl, thiophene, and pyridine groups, and wherein R$_1$ and R$_2$ together can form part of a N- or O- heterocyclic radical.

2. 7-halogen-3-benzylaminobenzotriazine-1,2,4-oxide-1.

3. 7-halogen - 3 - allylaminobenzotriazine-1,2,4-oxide-1.

4. 7 - halogen-3-di-n-propylbenzotriazine-1,2,4-oxide-1.

5. 7 - chloro-3-benzylaminobenzotriazine-1,2,4-oxide-1.

6. 7-chloro-3-allylaminobenzotriazine-1,2,4-oxide-1.

7. 7-chloro-3-di-n-propylbenzotriazine-1,2,4-oxide-1.

FRANK J. WOLF.
KARL PFISTER, III.

REFERENCES CITED

The following references are of record in the file of this patent:

UNITED STATES PATENTS

| Number | Name | Date |
|---|---|---|
| 2,235,480 | Graenacher | Mar. 18, 1941 |
| 2,394,306 | Heintrich | Feb. 5, 1946 |

OTHER REFERENCES

Bischler: Berichte, 22 (1889), pp. 2818, 2817, 2808.
Arndt: Berichte, 50 (1917), pp. 1248–1261.
Parkes: Chemical Society J., 1938, p. 1843.